(12) United States Patent
Stammer et al.

(10) Patent No.: US 11,708,494 B2
(45) Date of Patent: Jul. 25, 2023

(54) OLEOPHOBIC AND HYDROPHOBIC COMPOSITION

(71) Applicant: ICP Construction, Inc., Andover, MA (US)

(72) Inventors: Andreas Stammer, Mainz (DE); Stuart I. Anderson, Mosman (AU); Kevin E. Perry, Boston, MA (US); Christopher W. Livesey, Milford, MA (US)

(73) Assignee: ICP Construction, Inc., Andover, MA (US)

( * ) Notice: Subject to any disclaimer, the term of this patent is extended or adjusted under 35 U.S.C. 154(b) by 309 days.

(21) Appl. No.: 16/790,842

(22) Filed: Feb. 14, 2020

(65) Prior Publication Data

US 2021/0253867 A1 Aug. 19, 2021

(51) Int. Cl.
| | |
|---|---|
| *C09D 5/00* | (2006.01) |
| *C09D 7/63* | (2018.01) |
| *C08K 5/5419* | (2006.01) |

(52) U.S. Cl.
CPC .............. *C09D 5/00* (2013.01); *C08K 5/5419* (2013.01); *C09D 7/63* (2018.01)

(58) Field of Classification Search
CPC ........... C09D 5/00; C09D 7/63; C08K 5/5419
USPC ........................................................ 524/261
See application file for complete search history.

(56) References Cited

U.S. PATENT DOCUMENTS

| | | | |
|---|---|---|---|
| 4,617,057 A | 10/1986 | Plueddemann | |
| 6,239,211 B1* | 5/2001 | Keeping | C08L 83/04 |
| | | | 524/588 |
| 7,005,460 B2 | 2/2006 | Bublewitz et al. | |
| 10,092,885 B2 | 10/2018 | Bormashenko | |
| 2007/0042533 A1* | 2/2007 | Endo | H01L 23/3737 |
| | | | 524/588 |
| 2010/0298467 A1 | 11/2010 | Stammer et al. | |
| 2013/0029311 A1 | 1/2013 | Goscha | |
| 2015/0147523 A1 | 5/2015 | Kumar et al. | |
| 2019/0009225 A1 | 1/2019 | Bormashenko | |
| 2021/0189071 A1* | 6/2021 | Schindler | C08G 77/20 |

FOREIGN PATENT DOCUMENTS

| | | | | |
|---|---|---|---|---|
| CN | 1062280834 | A | 1/2017 | |
| CN | 106987875 | A | 7/2017 | |
| CN | 107163254 | A | 9/2017 | |
| CN | 107353821 | A | 11/2017 | |
| EP | 1555249 | A1 | 7/2005 | |
| EP | 2990527 | A1 | 2/2016 | |
| WO | WO-2019228643 | A1 * | 12/2019 | ............. C08G 77/18 |

OTHER PUBLICATIONS

International Search Report and Written Opinion of the International Searching Authority for PCT/US21/17930 corresponding PCT application) dated Apr. 23, 2021.
International Preliminary Report on Patentability and Written Opinion of the International Searching Authority for Copending PCT/US21/017930 dated Aug. 11, 2022.
EPO English language Abstract for CN107353821(A) Nov. 17, 2017.
EPO English language Abstract for CN107163254(A) Sep. 15, 2017.
EPO English language Abstract for CN106987875(A) Jul. 28, 2017.
EPO English language Abstract for CH106280834(A), Jan. 4, 2017.
English language machine translation of the Description of CN107353821(A) Nov. 17, 2017.
English language machine translation of the Claims of CN106987875(A) Jul. 28, 2017.

* cited by examiner

*Primary Examiner* — Kelechi C Egwim
(74) *Attorney, Agent, or Firm* — Fredrikson & Byron, P.A.

(57) ABSTRACT

The invention pertains generally to providing an increased amount of both hydrophobicity and oleophobicity by the combination of at least one silane and at least one siloxane, the silane preferably being a trialkoxysilane of Formula (I) and at least one polysiloxane of Formula (II), the combined composition of silane and polysiloxane having no added perfluorinated compounds. The invention further includes an ability to darken the color of the surface to which it is applied by at least 5, preferably 10 "L" units, giving the surface more of a "wet" look.

16 Claims, No Drawings

OLEOPHOBIC AND HYDROPHOBIC COMPOSITION

CROSS-REFERENCE TO RELATED APPLICATIONS

None.

TECHNICAL FIELD

The invention described herein pertains generally to oil repellence by the use of alkyl-alkoxy-silanes in combination with polysiloxanes, both well-known hydrophobic agents (but not known to be oleophobic). As used in this application, "oleophobic" is defined as preventing the penetration and wetting of a nonpolar liquid at ambient temperature. As used in this application, "oil" is defined as a liquid substance that is both hydrophobic and lipophilic.

BACKGROUND OF THE INVENTION

The surface properties of a coating, with regards to wetting by liquids, are determined by the chemistry and topography at the interface. By selecting the correct chemistry and topography, a coating can display a variety of liquid wetting properties. These properties can be exploited for a variety of applications. Surface treatments that repel not only water, but oil and oil-based stains are widely used in different industries such as construction, textile or paper. Generally, these treatments contain fluorine in form of perfluorinated carbon atoms. These perfluorinated groups provide the oil-repellence.

The combination of using silicones to provide hydrophobic properties and perfluorinated materials to provide oleophobic properties is described in issued U.S. Pat. No. 4,617,057 by Plueddemann.

For instance, coatings that repel water (hydrophobic) are useful for self-cleaning applications. Coatings that attract water (hydrophilic) are useful for anti-fogging applications. Coatings with surface tensions lower than that of water (72 mN m$^{-1}$) but higher than that of oils (20-30 mN m$^{-1}$) can attract oils (oleophilic) but repel water and can be used to create oil-water separators. Coatings with lower surface tensions (~20 mN m$^{-1}$ or less) will repel both oil (oleophobic) and water and are useful for anti-fouling.

However, the usage of perfluorinated hydrocarbons is becoming restricted for environmental reasons. Furthermore, when exposed to high temperature, e.g. in case of a fire, strong acids can be formed.

Therefore, a need exists for materials that repel water and oil and are free of organic (covalently bound) fluorine or other halogens.

SUMMARY OF THE INVENTION

The present invention is directed to an oil- and water-repellent coating composition comprising 30-90% of an organofunctional silane according to Formula (I) and 10-70% of an organopolysiloxane according to Formula (II), a catalyst, and optionally additives (e.g., pigments, dyes, etc.) as applied to porous materials, e.g., natural stone, artificial stone, etc.) or as applied to wood, leather, paper or cardboard, or as applied to a textile, woven or non-woven.

The invention includes more specifically, a composition comprising: A composition comprising:

30-90% of a trialkoxysilane of Formula (I);

wherein $R_1$ of Formula (I) is selected from the group consisting of linear, cyclic or branched $C_{12-30}$ alkyl, $C_{12-30}$ alkenyl and $C_{12-30}$ alkylaryl groups; and wherein $R_2$, $R_3$ and $R_4$ of Formula (I) are selected independently from the group consisting of linear, cyclic or branched $C_{1-6}$ alkyl, $C_{1-6}$ alkenyl, isoalkenyl, and $C_{3-12}$ oxime forming groups; and 10-70% of a polysiloxane of Formula (II)

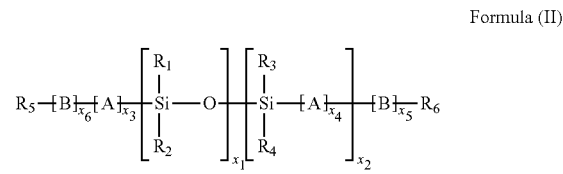

wherein $R_1$, $R_2$, $R_3$, $R_4$, $R_5$ and $R_6$ of Formula (II) are selected independently from the group consisting of H. OH, linear, cyclic or branched $C_{1-18}$alkyl, $C_{1-6}$ alkenyl, $C_{1-6}$ alkoxy, $C_{1-6}$ aminoalkyl, $C_{1-12}$ vinyl alkyl; $C_{6-18}$ aryl, $C_{3-18}$ epoxy-forming groups and di($C_{1-6}$ alkyl) hydrogensilyl;

wherein A is independently O or $C_{1-6}$ alkyl;

wherein B is independently $Si(R_1)(R_2)$ or $R_1$;

wherein $x_1$ ranges from 1 to 3000 inclusive;

wherein $x_2$ ranges from 0 to 500 inclusive;

wherein $x_3$ is either 0 or 1;

wherein $x_4$ is either 0 or 1;

wherein $x_5$ is either 0 or 1;

wherein $x_6$ is either 0 or 1;

a catalyst; and wherein the composition having no added perfluorinated compounds and the weight percentages of all added components above totaling 100%.

In one aspect of the invention, the silane composition of Formula (I) is a methoxy or ethoxy-silane and the polysiloxane of Formula (II) is a polydimethylsiloxane, preferably a silanol terminated polydimethylsiloxane.

In another aspect of the invention, a catalyst is employed to accelerate the reaction between Formula (I) and Formula (II).

The catalyst composition is quite far-ranging, and a non-limiting exemplary list includes strong bases, (e.g., KOH, NaOH), strong acids (e.g., HCl, $C_{1-16}$ alkylbenzenesulfonic acids, etc.), $C_{1-12}$ alkylamines, $C_{1-12}$ alkanoic acids, $C_{1-12}$ alkanol, organotin compounds, organotitanate compounds and organozirconate compounds.

The composition often includes at least one other additive typically selected from the group consisting of a solvent, a pigment or dye, a thickener, a fungicide, a bactericide and an organic or an inorganic pigment.

The composition of Formula (I) and Formula (II) may be an emulsion.

The composition may be synthesized in a single step or in a multi-step procedure. When using a multi-step process, the composition is synthesized by mixing at least 30-90 wt. % of at least one silane of Formula (I) and at least one catalyst; mixing at least 30-90 wt. % of at least one silane of Formula (I) and at least one catalyst;

Formula (I)

wherein $R_1$ of Formula (I) is selected from the group consisting of linear, cyclic or branched $C_{12-30}$ alkyl, $C_{12-30}$ alkenyl and $C_{12-30}$ alkylaryl groups; and wherein $R_2$, $R_3$ and $R_4$ of Formula (I) are selected independently from the group consisting of linear, cyclic or branched $C_{1-6}$ alkyl, $C_{1-6}$ alkenyl, $C_{1-6}$ isoalkenyl, and $C_{3-12}$ oxime forming groups; and adding between 10-70 wt. % of at least one polysiloxane of Formula (II) to Formula (I) within 1 hour before application to a surface wherein Formula (II) is

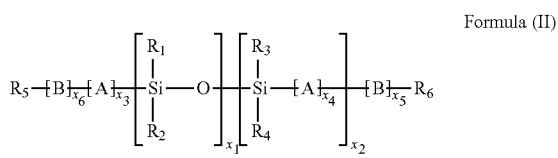

Formula (II)

wherein $R_1$, $R_2$, $R_3$, $R_4$, $R_5$ and $R_6$ of Formula (II) are selected independently from the group consisting of H, OH, linear, cyclic or branched $C_{1-18}$ alkyl, $C_{1-6}$ alkenyl, $C_{1-6}$ alkoxy, $C_{1-6}$ aminoalkyl, $C_{1-12}$ vinyl alkyl; $C_{6-18}$ aryl, $C_{3-18}$ epoxy-forming groups and di($C_{1-6}$alkyl) hydrogensilyl;

wherein A is independently O or $C_{1-6}$ alkyl;
wherein B is, independently $Si(R_1)(R_2)$ or $R_1$;
wherein $x_1$ ranges from 1 to 3000 inclusive;
wherein $x_2$ ranges from 0 to 500 inclusive;
wherein $x_3$ is either 0 or 1;
wherein $x_4$ is either 0 or 1;
wherein $x_5$ is either 0 or 1;
wherein $x_6$ is either 0 or 1;
a catalyst; and
wherein the composition having no added perfluorinated compounds and the weight percentages of all added components above totaling 100%.

The composition is typically applied to the surface of a substrate like a porous mineral building material comprising natural stone, artificial stone or a cementitious material, although other surfaces such as wood, leather, paper or cardboard are within the scope of this invention as is applying the composition to a surface or substrate which is woven or non-woven textile.

After application of the composition, the surface of the substrate becomes water resistant and oleophobic.

In a further aspect of the invention, the surface of the substrate permanently, or semi-permanently changes from a first color to a second darker color in appearance after application with the second color having a L value of at least equal to or greater than 5 units lower than the first color, more preferably 10 units.

These and other objects of this invention will be evident when viewed in light of the detailed description and appended claims.

DETAILED DESCRIPTION OF THE INVENTION

The best mode for carrying out the invention will now be described for the purposes of illustrating the best mode known to the applicant at the time of the filing of this invention. The examples and figures are illustrative only and not meant to limit the invention, as measured by the scope and spirit of the claims.

Unless the context clearly indicates otherwise: the word "and" indicates the conjunctive; the word "or" indicates the disjunctive; when the article is phrased in the disjunctive, followed by the words "or both" or "combinations thereof both the conjunctive and disjunctive are intended.

As used in this application, the term "approximately" is within 10% of the stated value, except where noted.

As used in this application, "oleophobic" is defined as preventing the penetration and wetting of a nonpolar liquid at ambient temperature and as used in this application, "oil" is defined as a liquid substance that is both hydrophobic and lipophilic.

As used herein, the term "flexible" materials mean a woven or non-woven network of natural or artificial fibers.

As used herein, the term "water-resistant" means a reduction in water absorption into a substrate compared to an untreated control in which water absorption is reduced by at least 50% in a 1 hour soak test.

Colors can be quantified using the L, a, b values approach. As used herein, when discussing the color change of the surface of the substrate permanently, or semi-permanently from a first color to a second darker color in appearance after application is meant that the L value of the second color is at least 5 units lower, preferably at least 10 units lower, compared to the L value of the first color, A L value of 100 means white and a L value of 0 means black. When the L value is reduced by e.g, by 5, this is determined to be an enhancement.

As used herein, and unless otherwise stated, the term "alkylaryl" refers to an aryl group (such as defined above) onto which an aliphatic saturated hydrocarbon monovalent group is attached, and wherein the said aliphatic or aryl groups may be optionally substituted with one or more substituents independently selected from the group consisting of chlorine and bromine, amino, hydroxyl, sulfhydryl, alkyl, and nitro. Specific non-limiting examples of the unsubstituted or alkyl-substituted aryl groups are the aryl groups having 6 to 18 carbon atoms such as phenyl, diphenyl and naphthyl groups, and alkylaryl groups having 7 to 40 carbon atoms wherein the alkyl group may be straight-chain or branched and may be bonded to any position on the aryl group, such as tolyl, xylyl, ethylphenyl, propylphenyl, butylphenyl, pentylphenyl, hexylphenyl, heptylphenyl, octylphenyl, nonylphenyl, decylphenyl, undecylphenyl, dodecylphenyl, diethylphenyl, dibutylphenyl and diacetylphenyl groups. The alkylaryl groups may additionally have substituents including functional groups such as alkoxy, hydroxy, cyano, nitro, halides, carboxylic acids, etc.

Organo-functional silanes find their use in a variety of applications e.g. as coupling agents. The class of silanes useful for the invention are alkylsilanes with three hydrolysable groups (e.g., alkytrialkoxysilanes) of the following type illustrated in Formula (I);

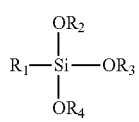
Formula (I)

wherein $R_1$ of Formula (I) is selected from the group consisting of linear, cyclic or branched $C_{12-30}$ alkyl, $C_{12-30}$ alkenyl and $C_{12-30}$ alkylaryl groups (e.g., alkyl benzyl) groups; and wherein $R_2$, $R_3$ and $R_4$ of Formula (I) are selected independently from the group consisting of linear, cyclic or branched $C_{1-6}$ alkyl, $C_{1-6}$ alkenyl, $C_{1-6}$ isoalkenyl, e.g., methyl, ethyl, n-propyl, iso-propyl, n-butyl, iso-butyl, phenyl, acetyl, e.g., iso-propene (—C(=CH$_2$)(—CH$_3$) (which forms acetone as leaving group) or propenoxy in addition to $C_{3-12}$ oxime-forming groups as —N=C (—CH$_3$)(—CH$_2$CH$_3$).

In addition to Formula (I), a silane a polymer of the following structure is required of the type illustrated in Formula (II)

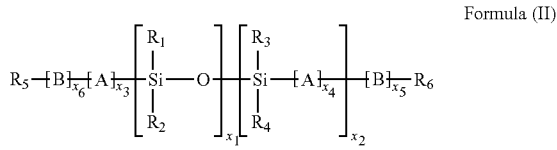
Formula (II)

wherein $R_1$, $R_2$, $R_3$, $R_4$, $R_5$ and $R_6$ of Formula (II) are selected independently from the group consisting of H, OH, linear, cyclic or branched $C_{1-18}$alkyl, alkenyl, (e.g., methyl, ethyl, n-propyl, isopropyl, phenyl), $C_{1-6}$ alkoxy, $C_{1-6}$ aminoalkyl, (e.g., aminoethyl (—(CH$_2$)$_2$—NH$_2$), aminopropyl (—(CH$_2$)$_3$—NH$_2$), or aminoethylaminopropyl (—(CH$_2$)$_3$—NH—(CH$_2$)$_2$—NH$_2$); $C_{1-12}$ vinyl alkyl (e.g., $R_y$—CH=CH$_2$ with $R_y$=$C_{1-10}$ alkyl groups); $C_{6-18}$ aryl and $C_{3-18}$ epoxy-forming groups (e.g., $R_z$—COCH$_2$ with $R_z$=$C_{1-10}$ alkyl groups); and di($C_{1-6}$ alkyl)hydrogensilyl (e.g., dimethylhydrogensilyl);

wherein A is independently O or $C_{1-6}$ alkyl;
wherein B is independently Si($R_1$)($R_2$) or $R_1$;
wherein $x_1$ ranges from 1 to 3000 inclusive, which equates to a viscosity of up to ~200000 mPas, as higher viscosities are not useful for the application;
wherein $x_2$ ranges from 0 to 500 inclusive;
wherein $x_3$ is either 0 or 1;
wherein $x_4$ is either 0 or 1;
wherein $x_5$ is either 0 or 1;
wherein $x_6$ is either 0 or 1;
a catalyst; and
wherein the composition having no added perfluorinated compounds and the weight percentages of all added components above totaling 100%.

The polysiloxane can contain some branching of up to 3% (mol. % Si) of so-called silicone T or Q-units as described in Encyclopaedia of Polymer Science and Technology, Vol. 11, Silicones wherein the M unit $R_3$—Si—O—, the D unit=$R_2$—Si—O$_2$—; and the T unit=R—Si—O$_3$—; Q unit=Si—O$_4$—. Siloxane copolymers may be described according to their macrostructure, i.e. how the M, D, T and Q units are combined in the polymer. Several classes of copolymer can be recognized.)

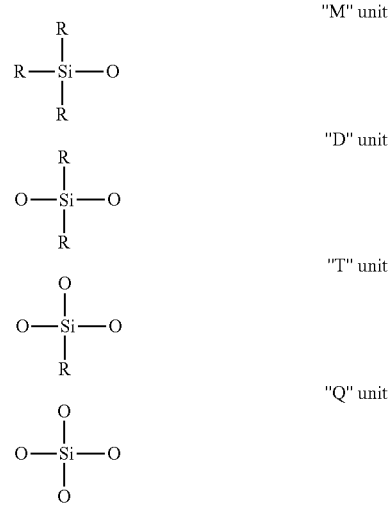

The polysiloxane may contain some linear chain polysiloxanes (MDnM), These comprise linear polymers where M and D units may be replaced by MX, MX, Y, MX, Y, Z and by DX, DX, Y units respectively. Several combinations of these units will generate telechelic and chain-functionalized linear copolymers. Since almost any organic or inorganic group can be attached to the siloxane backbone, such copolymers exhibit a wide range of interesting properties and are used in many applications.

The polysiloxane may also contain branched chain polysiloxanes. These are linear chains containing T, TX or Q units as branching centres.

The polysiloxane may further contain cyclic polysiloxanes. Various combinations of D and T units can generate macrocyclics that may be classified into four subgroups, viz. monocyclic, polycyclic, spirocyclic and spherocyclic polysiloxanes. The three latter groups can be interpreted as arising from a cross-linking of monocyclic ring systems.

And lastly, the polysiloxane may contain cross-linked polysiloxanes. These molecular structures are three-dimensional networks where T and/or Q units are combined with D and/or M units. A variety of polymers of complex structures are thus produced such as ladder-structured polymers and silicone resins Preferably $R_1$, $R_2$, $R_3$ are methyl groups, $R_4$ is a phenyl group, $x_1$>$x_2$ and $R_5$ and $R_6$ are hydrogen atoms. Most preferred $R_1$, $R_2$, $R_3$ and $R_4$ are methyl groups and $R_5$ and $R_6$ are hydrogen atoms and A being a oxygen atom.

Optionally a catalyst is used in order to accelerate the hydrolysis and condensation reactions of the ingredients. The catalyst can be selected but is not limited to the following types: Acids, bases (including Lewis acids and bases) and metal organic compounds known to be catalytic active for alkoxy silane hydrolysis, exchange and condensation reactions can be used. A non-limiting and exemplary listing of catalysts applicable to this invention include, but are not limited to: KOH, NaOH HCl, DBSA dodecylbenzenesulfonic add which is a Brønsted acid surfactant-combined catalyst, composed of a polar head and along nonpolar chain, organotin compounds as DBTDL (dibutyltin dilaurate) or DMTDN (dimethyl tin dineodecanoate), titanates (e.g., tetra n-butyl titanate). Additional suitable condensation catalysts may be used, a non-limiting exemplary list may include condensation catalysts incorporating tin, lead, antimony, iron, cadmium, barium, manganese, zinc, chromium, cobalt, nickel, aluminum, gallium germanium, titanium and zirconium. Examples include metal triflates. Useful organotin compounds are those where the valence of the tin is either +2 or +4. These tin compounds are known in the art to promote the reaction between alkoxy groups substituted on silicon and hydroxyl groups substituted on silicon. Typical tin compounds useful as condensation, catalysts include stannous salts of carboxylic acids such as stannous stearate, stannous oleate, stannous naphthanate, stannous hexoate, stannous succinate, stannous caprylate, and stannous octoate; and stannic salts of carboxylic acids, such as dibutyltindilaurate, dibutyltindiacetate, dibutyltindioctoate, dibutyltindiformate, and dibutyltindineodecanoate, as well as partial hydrolysis products of the above. Organic tin metal catalysts such as triethyltin tartrate, tin octoate, tin oleate, tin naphthate, butyltintri-2-ethylhexoate, tinbutyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate, dibutyltin dibenzoate, stannous octoate, dimethyltin dineodeconoate, dibutyltin dioctoate of which dibutyltin dilaurate, dibutyltin diacetate, dibutyltindiacetylacetonate and dibutyltindimethoxylate are particularly preferred.

Zirconates (e.g., tetra n-butyl zirconate) are also applicable catalysts, an exemplary non-limiting list may include titanate and/or zirconate based catalysts according to the general formula $Ti[OR^5]_4$ and $Zr[OR^5]_4$ respectively where each $R^5$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of $R^5$ include but are not restricted to, methyl, ethyl, propyl, isopropyl, butyl, tertiary butyl and a branched secondary alkyl group such as 2,4-dimethyl-3-pentyl. Preferably, when each $R^5$ is the same, $R^5$ is an isopropyl, branched secondary alkyl group or a tertiary alkyl group, in particular, tertiary butyl, Alternatively, the titanate may be chelated. The chelation may be with any suitable chelating agent such as an alkyl acetylacetonate such as methyl or ethylacetylacetonate. Any suitable chelated titanates or zirconates may be utilised. Preferably the chelate group used is a monoketoester such as acetylacetonate and alkylacetoacetate giving chelated titanates such as, for example diisopropyl bis(acetylacetonyl)titanate, diisopropyl bis(ethylacetoacetonyl)titanate, diisopropoxytitanium Bis(Ethylacetoacetate) and the like. Examples of suitable catalysts are additionally described in EP1254192 and WO200149774 which catalysts are incorporated herein by reference.

The invention will now be described by a series of examples. Mixtures were prepared by adding the ingredients to glass bottles and homogenising them on a roll mixer. All ingredients are commercially available and were used without further purification. All silanes, titanate, zirconate, DBTDL and PDMS silanols were obtained from ABCR GmbH; KOH, Methanol and $CaCO_3$, were obtained from Carl Roth GmbH; Octoanic acid and dodecylbenzene sulfonic acid was obtained from Sigma Aldrich Germany, phenyl, vinyl, terminal hydrogen and ethoxy containing polymers were obtained from Gelest Inc; dimethyltin dineodecanoate was obtained from Momentive; polymethylhydrogensiloxane was obtained from Dow Chemical. The different mixtures where applied to a concrete paver and a terracotta type bricks by means of a brush and then allowed to cure for at least 1 week at ambient temperature (23° C. and ~60% RH). The application rate was 250 g/m² unless indicated otherwise.

Oil repellence was tested by applying 3 drops of olive oil on the substrates. If the oil drops were still present after 1 hour the formulation was rated as oil repellent. If 1 or more drops were absorbed into the substrate the formulation was rated as nonoil repellent.

A series of examples were prepared in the ratios (weight percent) and using the components identified in Table I.

TABLE I

| Ex | Silane | Siloxane (cSt = centistokes) | Catalyst | Oil repellent on brick | Oil repellent on paver |
|---|---|---|---|---|---|
| 1 | 90% hexadecyl trimethoxysilane $CH_3(CH_2)_{15}$—Si(OCH_3)_3 | 9.9% PDMS silanol 65 cSt HO—[Si(CH_3)_2—O]_n—H | 0.1% dimethyltin dineodecanoate [(CH_2)_6C(CH_3)_2C(O)O—Sn(CH_3)_2]_2 | yes | yes |
| 2 | 80% hexadecyl trimethoxysilane $CH_3(CH_2)_{15}$—Si(OCH_3)_3 | 19.9% PDMS silanol 65 cSt HO—[Si(CH_3)_2—O]_n—H | 0.1% dimethyltin dineodecanoate [(CH_2)_6C(CH_3)_2C(O)O—Sn(CH_3)_2]_2 | yes tested for 125, 250 and 500 g/m² | yes tested for 125, 250 and 500 g/m² |

TABLE I-continued

| Ex | Silane | Siloxane (cSt = centistokes) | Catalyst | Oil repellent on brick | Oil repellent on paver |
|---|---|---|---|---|---|
| 3 | 70% hexadecyl trimethoxysilane CH₃(CH₂)₁₅—Si(OCH₃)₃ | 29.9% PDMS silanol 65 cSt HO—[Si(CH₃)₂—O]ₙ—H | 0.1% dimethyltin dineodecanoate | yes | yes |
| 4 | 60% hexadecyl trimethoxysilane CH₃(CH₂)₁₅—Si(OCH₃)₃ | 99.9% PDMS silanol 65 cSt HO—[Si(CH₃)₂—O]ₙ—H | 0.1% dimethyltin dineodecanoate | yes | yes |
| 5 | 80% hexadecyl trimethoxysilane CH₃(CH₂)₁₅—Si(OCH₃)₃ | 19.9% PDMS silanol 65 cSt HO—[Si(CH₃)₂—O]ₙ—H | 0.1% dimethyltin dineodecanoate | yes | yes |
| 6 | 80% hexadecyl trimethoxysilane CH₃(CH₂)₁₅—Si(OCH₃)₃ | 17% PDMS silanol 65 cSt HO—[Si(CH₃)₂—O]ₙ—H | 3% aminopropyltriethoxysilane C₂H₅O—Si—(CH₂)₃NH₂ | yes | no |
| 7 | 80% hexadecyl trimethoxysilane CH₃(CH₂)₁₅—Si(OCH₃)₃ | 19.9% PDMS silanol 65 cSt HO—[Si(CH₃)₂—O]ₙ—H | 0.1% dimethyltin dineodecanoate | yes | yes |
| 8 | 80% hexadecyl trimethoxysilane CH₃(CH₂)₁₅—Si(OCH₃)₃ | 19.9% PDMS silanol 25 cSt HO—[Si(CH₃)₂—O]ₙ—H | 0.1% dimethyltin dineodecanoate | yes | yes |
| 9 | 80% hexadecyl trimethoxysilane CH₃(CH₂)₁₅—Si(OCH₃)₃ | 19.9% PDMS silanol 2000 cSt HO—[Si(CH₃)₂—O]ₙ—H | 0.1% dimethyltin dineodecanoate | yes | yes |

TABLE I-continued

| Ex | Silane | Siloxane (cSt = centistokes) | Catalyst | Oil repellent on brick | Oil repellent on paver |
|----|--------|------------------------------|----------|------------------------|------------------------|
| 10 | 80% hexadecyl trimethoxysilane 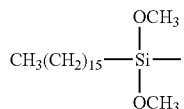 | 19.9% PDMS silanol 50000 cSt 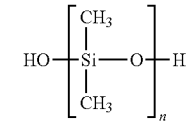 | 0.1% dimethyltin dineodecanoate 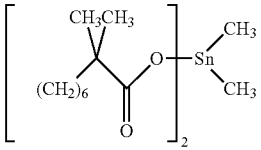 | yes | yes |
| 11 | 80% hexadecyl trimethoxysilane 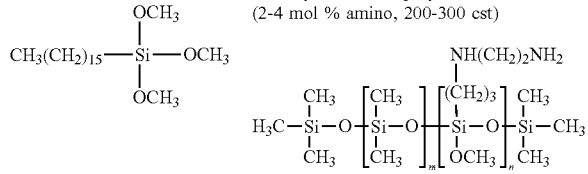 | 19.9% Aminoethylaminopropyl-Methoxysiloxane dimethylsiloxane copolymer (2-4 mol % amino, 200-300 cst) 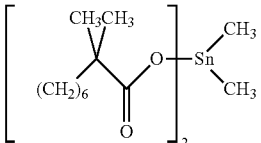 | 0.1% dimethyltin dineodecanoate 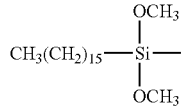 | yes | yes |
| 17 | 80% hexadecyl trimethoxysilane 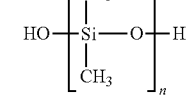 | 19.9% PDMS silanol 65 cSt 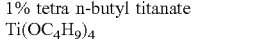 | 1% tetra n-butyl titanate Ti(OC$_4$H$_9$)$_4$ | yes | yes |
| 18 | 70% hexadecyl trimethoxysilane 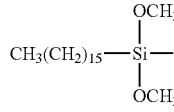 | 29.0% PDMS silanol 65 cSt 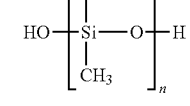 | 1% tetra n-butyl titanate Ti(OC$_4$H$_9$)$_4$ | yes | yes |
| 19 | 78% n-octadecyl trimethoxysilane 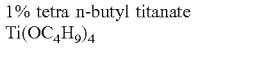 | 19.0% PDMS silanol 65 cSt 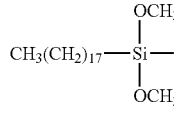 | 3% tetra n-propylzirconate (70% in n-propanol) Zr(OC$_3$H$_7$)$_4$ | yes | no |
| 20 | 80% hexadecyl trimethoxysilane 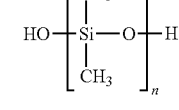 | 19.0% PDMS silanol 65 cSt 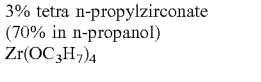 | 1% n-octoanic acid CH$_3$(CH$_2$)$_6$COOH | yes | no |
| 21 | 70% hexadecyl trimethoxysilane 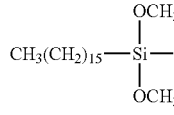 | 27% PDMS silanol 65 cSt 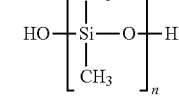 | 3% aminopropyltriethoxysilane C$_2$H$_5$O—Si—(CH$_2$)$_3$NH$_2$ | yes (6 weeks cure) | no |

TABLE I-continued

| Ex | Silane | Siloxane (cSt = centistokes) | Catalyst | Oil repellent on brick | Oil repellent on paver |
|---|---|---|---|---|---|
| 22 | 70% hexadecyl trimethoxysilane<br>CH$_3$(CH$_2$)$_{15}$—Si(OCH$_3$)$_3$ | 27% PDMS silanol 65 cSt<br>HO—[Si(CH$_3$)$_2$—O]$_n$—H | 3% N-(2-aminoethyl)-3-aminopropyltrimethoxysilane N-(3-(Trimethoxysilyl)propyl)ethylene diamine (CH$_3$O)$_3$Si(CH$_2$)$_3$NHCH$_2$CH$_2$NH$_2$ | yes | yes (6 weeks cure) |
| 23 | 80% hexadecyl trimethoxysilane<br>CH$_3$(CH$_2$)$_{15}$—Si(OCH$_3$)$_3$ | 19% PDMS silanol 65 cSt<br>HO—[Si(CH$_3$)$_2$—O]$_n$—H | 1% KOH in Methanol (10% wt) | yes (500 g/m$^2$ applied) | no |
| 24a | 80% hexadecyl trimethoxysilane<br>CH$_3$(CH$_2$)$_{15}$—Si(OCH$_3$)$_3$ | 19.8% triethoxysilylethyl terminated polydimethylsiloxane 8-12 cSt<br>(C$_2$H$_5$O)$_3$SiC$_2$H$_4$—Si(CH$_3$)$_2$—O—[Si(CH$_3$)$_2$—O]$_n$—Si(CH$_3$)$_2$—C$_2$H$_4$Si(OC$_2$H$_5$)$_3$ | 0.2% dimethyltin dineodecanoate | yes | no |
| 24b | 70% hexadecyl trimethoxysilane<br>CH$_3$(CH$_2$)$_{15}$—Si(OCH$_3$)$_3$ | 29.9% triethoxysilylethyl terminated polydimethylsiloxane 8-12 cSt | 0.2% dimethyltin dineodecanoate | yes | yes |
| 24c | 80% hexadecyl trimethoxysilane<br>CH$_3$(CH$_2$)$_{15}$—Si(OCH$_3$)$_3$ | 19% triethoxysilylethyl terminated polydimethylsiloxane 8-12 cSt | 1% DBTDL (di-n-butyltindilaurate) (C$_4$H$_9$)$_2$Sn[OCO(CH$_2$)$_{10}$CH$_3$]$_2$ | yes | no |
| 24d | 70% n-octadecyl trimethoxysilane<br>CH$_3$(CH$_2$)$_{17}$—Si(OCH$_3$)$_3$ | 19% triethoxysilylethyl terminated polydimethylsiloxane 8-12 cSt | 1% DBTDL (di-n-butyltindilaurate) (C$_4$H$_9$)$_2$Sn[OCO(CH$_2$)$_{10}$CH$_3$]$_2$ | yes | yes |
| 25a | 80% hexadecyl trimethoxysilane<br>CH$_3$(CH$_2$)$_{15}$—Si(OCH$_3$)$_3$ | 19.8% hydride terminated polydimethylsiloxane 7-10 cSt<br>H—Si(CH$_3$)$_2$—O—[Si(CH$_3$)$_2$—O]$_n$—Si(CH$_3$)$_2$—H | 0.2% dimethyltin dineodecanoate | yes | no |
| 25b | 70% hexadecyl trimethoxysilane<br>CH$_3$(CH$_2$)$_{15}$—Si(OCH$_3$)$_3$ | 29.7% hydride terminated polydimethylsiloxane 7-10 cSt | 0.3% dimethyltin dineodecanoate | yes | no |

TABLE I-continued

| Ex | Silane | Siloxane (cSt = centistokes) | Catalyst | Oil repellent on brick | Oil repellent on paver |
|---|---|---|---|---|---|
| 25c | 80% hexadecyl trimethoxysilane | 19% hydride terminated polydimethylsiloxane 7-10 cSt | 1% DBTDL (di-n-butyltindilaurate) $(C_4H_9)_2Sn[OCO(CH_2)_{10}CH_3]_2$ | yes | no |
| 25c | 70% n-octadecyl trimethoxysilane | 29% hydride terminated polydimethylsiloxane 7-10 cSt | 1% DBTDL (di-n-butyltindilaurate) $(C_4H_9)_2Sn[OCO(CH_2)_{10}CH_3]_2$ | yes | no |
| 26a | 80% hexadecyl trimethoxysilane | 19.8% silanol terminated (14-18% diphenylsiloxane)-dimethylsiloxane)-copolymer 50-60 cSt (95:5 mole ratio of dimethylsiloxane:diphenylsiloxane) | 0.2% dimethyltin dineodecanoate | yes | no |
| 26b | 70% hexadecyl trimethoxysilane | 29.6% silanol terminated (14-18% diphenylsiloxane)-dimethylsiloxane)-copolymer 50-60 cSt (95:5 mole ratio of dimethylsiloxane:diphenylsiloxane) | 0.4% dimethyltin dineodecanoate | yes | no |
| 26c | 80% hexadecyl trimethoxysilane | 19% silanol terminated (14-18% diphenylsiloxane)-dimethylsiloxane)-copolymer 50-60 cSt (95:5 mole ratio of dimethylsiloxane:diphenylsiloxane) | 1% DBTDL (di-n-butyltindilaurate) $(C_4H_9)_2Sn[OCO(CH_2)_{10}CH_3]_2$ | yes | yes |

TABLE I-continued

| Ex | Silane | Siloxane (cSt = centistokes) | Catalyst | Oil repellent on brick | Oil repellent on paver |
|---|---|---|---|---|---|
| 26d | 70% n-octadecyl trimethoxysilane $CH_3(CH_2)_{17}$—Si(OCH_3)_3 | 29% silanol terminated (14-18% diphenylsiloxane)-dimethylsiloxane)-copolymer 50-60 cSt (95:5 mole ratio of dimethylsiloxane:diphenylsiloxane) | 1% DBTDL (di-n-butyltindilaurate) $(C_4H_9)_2Sn[OCO(CH_2)_{10}CH_3]_2$ | yes | no |
| 27a | 80% hexadecyl trimethoxysilane $CH_3(CH_2)_{15}$—Si(OCH_3)_3 | 19.75% (10-15% vinylmethylsiloxane)-dimethylsiloxane copolymer, silanol terminated, 25-40 cSt | 0.25% dimethyltin dineodecanoate | yes | no |
| 27b | 80% hexadecyl trimethoxysilane $CH_3(CH_2)_{15}$—Si(OCH_3)_3 | 19.75% (10-15% vinylmethylsiloxane)-dimethylsiloxane copolymer, silanol terminated, 25-40 cSt | 0.25% dimethyltin dineodecanoate | no | yes |
| 27c | 80% n-octadecyl trimethoxysilane $CH_3(CH_2)_{17}$—Si(OCH_3)_3 | 19% (10-15% vinylmethylsiloxane)-dimethylsiloxane copolymer, silanol terminated, 25-40 cSt | 1% DBTDL (di-n-butyltindilaurate) $(C_4H_9)_2Sn[OCO(CH_2)_{10}CH_3]_2$ | yes | no |
| 27d | 70% n-octadecyl trimethoxysilane $CH_3(CH_2)_{17}$—Si(OCH_3)_3 | 29% (10-15% vinylmethylsiloxane)-dimethylsiloxane copolymer, silanol terminated, 25-40 cSt | 1% DBTDL (di-n-butyltindilaurate) $(C_4H_9)_2Sn[OCO(CH_2)_{10}CH_3]_2$ | yes | yes |

TABLE I-continued

| Ex | Silane | Siloxane (cSt = centistokes) | Catalyst | Oil repellent on brick | Oil repellent on paver |
|---|---|---|---|---|---|
| 28 | 80% hexadecyl trimethoxysilane 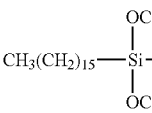 | 19.7% polymethyl hydrogensiloxane-n sufficient to achieve ($M_n$ = 1700-3200) 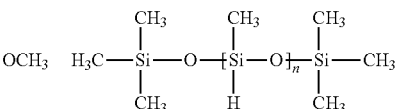 | 0.3% dimethyltin dineodecanoate 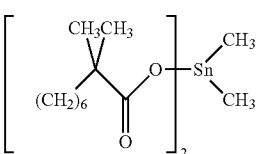 | yes (6 weeks cure) | no |
| 29 | 80% hexadecyl trimethoxysilane 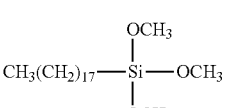 | 19% PDMS silanol 65 cSt 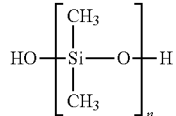 | 1% dimethyltin dineodecanoate 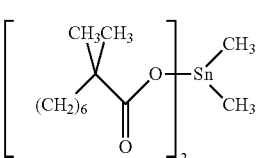 | yes | yes |
| 30 | 80% hexadecyl trimethoxysilane 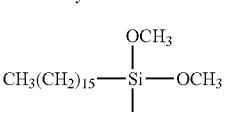 | 19% PDMS silanol 65 cSt 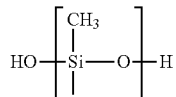 | 1% dodecylbenzenesulfonic acid 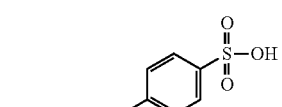 | yes | not tested |

(all percentages are in weight percent, the combination of components totalling 100 wt. %)

TABLE II

| Ex | Silane | Siloxane | Catalyst | Oil repellent on brick | Oil repellent on paver |
|---|---|---|---|---|---|
| 31 | 90% n-octadecyl triethoxysilane | 9.9% PDMS silanol 65 cSt | 0.1% dimethyltin dineodecanoate | no | no |
| 32 | 80% iso-butyl triethoxysilane | 19.9% PDMS silanol 65 cSt | 0.1% dimethyltin dineodecanoate | no | no |
| 33 | 80% trimethoxysilane | 19.9% PDMS silanol 65 cSt | 0.1% dimethyltin dineodecanoate | no | no |

TABLE II-continued

| Ex | Silane | Siloxane | Catalyst | Oil repellent on brick | Oil repellent on paver |
|---|---|---|---|---|---|
| 34 | 99.9% hexadecyl trimethoxysilane $CH_3(CH_2)_{15}-Si(OCH_3)_3$ | none | 0.1% dimethyltin dineodecanoate | no | no |
| 35 | 3% methyl trimethoxysilane $H_3C-Si(OCH_3)_3$ | 96.9% PDMS silanol 65 cst (centistokes) $HO-[Si(CH_3)_2-O]_n-H$ | 0.1% DBTDL | no | no |
| 36 | | 100% PDMS silanol 65 cSt $HO-[Si(CH_3)_2-O]_n-H$ | | no | no |
| 37 | | Capstone ST 200 diluted to 4% active content in Isopropanol (a commercial fluoroproduct from Chemours) | | yes | yes |

(all percentages are in weight percent, the combination of components totalling 100 wt. %)

As shown from the combination of the results of Table I and Table II, the invention requires a combination of Formula (I) and Formula (II) with no addition of perfluorinated compounds to achieve both hydrophobicity and oleophobicity. This is clearly show in Example #34 where only a silane was employed with no siloxane. As also clearly demonstrated in the tables, $R_1$ in Formula (I) needs to be a sufficient number of carbons (at least 12) for the beneficial impact to be realized as illustrated in Examples #31-#33. The value of some catalysts versus others is illustrated in #6 where oil-repellency was achieved on bricks only, but not on pavers.

The mixtures are also excellent water repellents as shown in the following example wherein the formulation form Example #2 was coated on bricks and concrete paver using different coverage rates. The water repellency was measured using the Rilem method, the amount of water absorbed into the substrates at a given time is reported in ml (using horizontal test tubes), For comparison the results for an untreated reference substrate are reported as well. Rilem Test Method—Test No. II.4 Horizontal Application (Réunion Internationale des Laboratoires et Experts des Matériaux, systèmes de construction et ouvrages). The results are tabulated in Table III.

TABLE III

| | Brick | | | Concrete paver | | | |
|---|---|---|---|---|---|---|---|
| | 125 g/m² | 250 g/m² | Untreated reference | 125 g/m² | 250 g/m² | 500 g/m² | Untreated reference |
| 15 min | 0 | 0 | >4 | 0 | 0 | 0.1 | >4 |
| 30 min | 0 | 0 | — | 0 | 0 | 0.1 | — |
| 1 h | 0 | 0 | — | 0.1 | 0 | 0.2 | — |
| 2 h | 0 | 0 | — | 0.1 | 0 | 0.2 | — |
| 4 h | 0 | 0 | — | 0.1 | 0 | 0.2 | — |
| 24 h | 0.1 | 0.1 | — | 0.2 | 0.2 | 0.3 | — |

As illustrated in the table, to the untreated surface, the treatment on the brick and concrete paver caused significant less water to be absorbed. The formulation was stable when in a closed container for 8 weeks at 50'C.

The formulation enhances the surface leading to a darker, more homogenous wet like look of stones and concrete. This mixtures are as enhancing the color as shown in the following example wherein the formulation from Ex. #2 was coated on various substrates and the L,a,b values were measured. The following Table IV shows how the treatment significantly reduces the L values (average of 3 measurements), the reduction in "L" values being at least equal to or greater than 5 "L" units, more preferably at least equal to or greater than 10 "L" units. The application of the composition of Formulas (I) and (II) results in, a surface with the desirable "wet" look, a visual appearance which is maintained even after drying of the composition.

TABLE IV

|   | Granite (salt and pepper) | Gray slate | Red brick | Black Granite | Gray concrete paver |
|---|---|---|---|---|---|
| Untreated |
| L | 57.05 | 53.34 | 49.66 | 43.27 | 55.41 |
| a | −0.32 | −2.42 | 14.84 | 0.33 | 0.49 |
| b | 2.14 | 2.43 | 17.60 | 3.65 | 6.60 |
| Treated |
| L | 33.85 | 38.86 | 36.76 | 27.18 | 38.02 |
| a | 0.04 | −1.60 | 18.90 | 0.21 | 0.69 |
| b | 1.99 | 5.41 | 19.81 | 1.44 | 6.81 |
| Δ L | 23.20 | 14.48 | 12.90 | 16.09 | 17.39 |

The darkening (enhancement) of the substrate is permanent. Unlike water or a solvent which will evaporate or non-reactive oils that wash out or migrate deeper into a substrate, the treatment will chemically react ideally forming covalent bonds to the substrate. The visibility of the color change is dependent, on the amount applied and colour/type of substrate. Concrete pavers and terracotta type bricks treated (with 250 g/m$^2$) more than a year ago, and stored inside and outside on a roof, still show the color enhancement.

The formulations can be provided in form of an emulsion:

Example 38: To 46 g of demineralised water, 2 g of Genapol 0X80 (Clariant) and 2 g of Tergitol TMN-6 (Dow Chemical) are added and mixed with an Ultraturrax mixer, 10 g of a silanol terminated PDMS (65 cSt) and 40 g of hexadecyltrimethoxysilane were premixed in a beaker and slowly added (by means of a pipette) to the surfactant solution while continuing mixing with the Ultraturrax mixer at 24000 rpm. A white emulsion is formed. The emulsion was applied to a concrete paver and allowed to cure for 4 weeks. The paver shows oil repellence when tested with olive oil.

The formulation can also be provided in the form of a two-component system. This is useful when fillers are used which tend to settle from the mixture, shelf life of a mixture is short or fast cure is desired.

Example 39: Component A: 60 parts of hexadecyltrimethoxysilane mixed with 0.5 parts of UL 28; Component B: 29.5 g of a silanol terminated PDMS (65 cSt) and 10 g calcium carbonate powder (1 micron mean particle size). Component A and B are mixed within one (1) hour of preparation and applied to a surface of a paver and terracotta type brick (application rate for both 250 g/m$^2$). The surfaces show oil repellence after 24 h when tested with olive oil.

Example 40: The mixture being as described in Table 1 Example #2 and applied to the following materials; polished Carrara marble, flamed finish green granite, polished brown marble (café Armani), honed finish tumbled travertine, honed finish Jerusalem limestone, Brown honed Sydney sandstone, Himalayan teak honed sandstone, Chinese grey slate, Encaustic tile (Made in Vietnam), Brighton Masonry Charcoal concrete paver, photocopy paper (Reflex Ultra White A4 80 gsm), unsanded maple hardwood, inside of leather belt (Trent Nathan New Zealand) allowed to cure for at least 1 week at ambient temperature (23° C. and ~60% RH). Oil repellence was tested by applying 3 drops of olive oil on the substrates. If the oil drops were still present after 1 hour the formulation was rated as oil repellent. If 1 or more drops were absorbed into the substrate the formulation was rated as non-oil repellent.

| Example | Substrate | Oil repellent |
|---|---|---|
| a | polished Carrara marble | yes |
| b | flamed finish green granite | yes |
| c | polished brown marble | yes |
| d | honed finish tumbled travertine | yes |
| e | honed finish Jerusalem limestone | yes |
| f | Brown honed Sydney sandstone | yes |
| g | Himalayan teak honed sandstone | yes |
| h | Chinese grey slate | yes |
| i | Encaustic tile | yes |
| j | Brighton Masonry Charcoal concrete paver | yes |
| k | photocopy paper | yes |
| l | unsanded maple hardwood | yes |
| m | leather | yes |

Example #37 in Table II illustrates a commercially available product for comparative purposes. The product is available from Chemours. The test shows that a product containing perfluorated carbon atoms repels olive oil in the test just as the compositions falling under this invention and which are free of perfluorinated carbon atoms.

The diversity of the composition for the "R" groups for the silane and siloxane compounds is quite broad, in which an amine side group is illustrated in Ex. #11; an ethoxy end group is illustrated in Ex. #24(a)-(d) and #29; hydrogen is illustrated as an end group in Ex. #25(a)-(d); a phenyl group is illustrated in Ex. #26(a)-(d); and a hydrogen side group in Ex. #28.

The diversity of applicable catalysts is equally broad, with some non-limiting examples including titanates (see Exs. #17 & 18); zirconates (see Ex. #19); carboxylic acids (see Ex. #20); amines (see Exs. #21 & 22): aminosilane (see Ex #6); strong base (see Ex. #23 for KOH); and strong acids (see Ex. #30 for DBSA).

The diversity of substrates that can be treated is shown in Example #40.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A composition comprising:
   30-90% of a trialkoxysilane of Formula (I);

Formula (I)

wherein $R_1$ of Formula (I) is selected from the group consisting of linear, cyclic or branched $C_{12\text{-}30}$ alkyl, $C_{12\text{-}30}$ alkenyl and $C_{12\text{-}30}$ alkylaryl groups; and wherein $R_2$, $R_3$ and $R_4$ of Formula (I) are selected independently from the group consisting of linear, cyclic or branched $C_{1-6}$ alkyl, $C_{1-6}$ alkenyl, $C_{1-6}$ isoalkenyl, and $C_{3-12}$ oxime forming groups; and 10-70% of a polysiloxane of Formula (II)

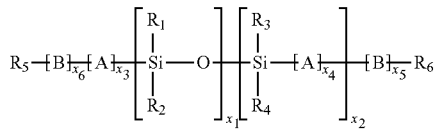

Formula (II)

wherein $R_1$, $R_2$, $R_3$, $R_4$, $R_5$ and $R_6$ of Formula (II) are selected independently from the group consisting of H, OH, linear, cyclic or branched $C_{1-18}$ alkyl, $C_{1-6}$ alkenyl, $C_{1-6}$ alkoxy, $C_{1-6}$ aminoalkyl, $C_{1-12}$ vinyl alkyl; $C_{6-18}$ aryl, $C_{3-18}$ epoxy-forming groups and di($C_{1-6}$ alkyl) hydrogensilyl;

wherein A is independently O or $C_{1-6}$ alkyl;

wherein B is independently $Si(R_1)(R_2)$ or $R_1$;

wherein $x_1$ ranges from 1 to 3000 inclusive;

wherein $x_2$ ranges from 0 to 500 inclusive;

wherein $x_3$ is either 0 or 1;

wherein $x_4$ is either 0 or 1;

wherein $x_5$ is either 0 or 1;

wherein $x_6$ is either 0 or 1;

a catalyst which accelerates the reaction between Formula (I) and Formula (II), the catalyst selected from the group consisting of KOH, NaOH, HCl, $C_{1-16}$ alkylbenzenesulfonic acids, a $C_{1-6}$ trialkoxy silanes, a $C_{1-12}$ alkylamines, $C_{1-12}$ alkanoic acids, $C_{1-12}$ alkanol, organotin compounds, organotitanate compounds and organozirconate compounds; and wherein the composition having no added perfluorinated compounds and the weight percentages of all added components above totaling 100% of the weight of the composition; and further wherein the composition exhibits both water-resistant and oleophobic characteristics.

2. The composition according to claim 1 wherein the silane composition of Formula (I) is a methoxy or ethoxysilane.

3. The composition according to claim 1 wherein the polysiloxane of Formula (II) is a polydimethylsiloxane.

4. The composition according to claim 1 wherein the polysiloxane of Formula (II) is a silanol terminated polydimethylsiloxane.

5. The composition according to claim 1 which is an emulsion, wherein the weight percentages of all components of the composition totaling 100% of the weight of the emulsion.

6. A composition according to claim 1 which is synthesized by:

mixing at least 30-90 wt. % of at least one silane of Formula (I) and at least one catalyst;

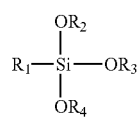

Formula (I)

wherein $R_1$ of Formula (I) is selected from the group consisting of linear, cyclic or branched $C_{12-30}$ alkyl, $C_{12-30}$ alkenyl and $C_{12-30}$ alkylaryl groups; and wherein $R_2$, $R_3$ and $R_4$ of Formula (I) are selected independently from the group consisting of linear, cyclic or branched $C_{1-6}$ alkyl, $C_{1-6}$ alkenyl, $C_{1-6}$ isoalkenyl, and $C_{3-12}$ oxime forming groups; and adding between 10-70 wt. % of at least one polysiloxane of Formula (II) to Formula (I) within 1 hour before application to a surface wherein Formula (II) is

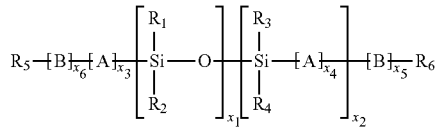

Formula (II)

wherein $R_1$, $R_2$, $R_3$, $R_4$, $R_5$ and $R_6$ of Formula (II) are selected independently from the group consisting of H, OH, linear, cyclic or branched $C_{1-18}$ alkyl, $C_{1-6}$ alkenyl, $C_{1-6}$ alkoxy, $C_{1-6}$ aminoalkyl, $C_{1-12}$ vinyl alkyl; $C_{6-18}$ aryl, $C_{3-18}$ epoxy-forming groups and di($C_{1-6}$ alkyl)hydrogensilyl;

wherein A is independently O or $C_{1-6}$ alkyl;

wherein B is independently $Si(R_1)(R_2)$ or $R_1$;

wherein $x_1$ ranges from 1 to 3000 inclusive;

wherein $x_2$ ranges from 0 to 500 inclusive;

wherein $x_3$ is either 0 or 1;

wherein $x_4$ is either 0 or 1;

wherein $x_5$ is either 0 or 1;

wherein $x_6$ is either 0 or 1;

a catalyst which accelerates the reaction between Formula (I) and Formula (II), the catalyst selected from the group consisting of KOH, NaOH, HCl, $C_{1-16}$ alkylbenzenesulfonic acids, a $C_{1-6}$ trialkoxy silanes, a $C_{1-12}$ alkylamines, $C_{1-12}$ alkanoic acids, $C_{1-12}$ alkanol, organotin compounds, organotitanate compounds and organozirconate compounds; and wherein the composition having no added perfluorinated compounds and the weight percentages of all added components above totaling 100% of the weight of the composition; and further wherein the composition exhibits both water-resistant and oleophobic characteristics.

7. The composition of claim 6 wherein the surface or substrate is selected from the group consisting of a porous mineral building material comprising natural stone, artificial stone and a cementitious material.

8. The composition of claim 6 wherein the surface or substrate is selected from the group consisting of wood, paper and cardboard.

9. The composition of claim 6 wherein the surface or substrate is selected from the group consisting of a leather, a textile and nonwoven.

10. The composition of claim 6 wherein the surface or substrate permanently, or semi-permanently changes from a first color to a second darker color in appearance after application with the second color having a L value of at least equal to or greater than 5 units lower than the first color.

11. The composition of claim 10 wherein the surface or substrate permanently, or semi-permanently changes from a first color to a second darker color in appearance after application with the second color having a L value of at least equal to or greater than 10 units lower than the first color.

12. A composition consisting of:
30-90% of a trialkoxysilane of Formula (I);

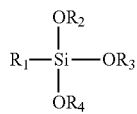

Formula (I)

wherein $R_1$ of Formula (I) is selected from the group consisting of linear, cyclic or branched $C_{12-30}$ alkyl, $C_{12-30}$ alkenyl and $C_{12-30}$ alkylaryl groups; and wherein $R_2$, $R_3$ and $R_4$ of Formula (I) are selected independently from the group consisting of linear, cyclic or branched $C_{1-6}$ alkyl, $C_{1-6}$ alkenyl, $C_{1-6}$ isoalkenyl, and $C_{3-12}$ oxime forming groups; and 10-70% of a polysiloxane of Formula (II)

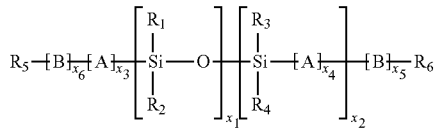

Formula (II)

wherein $R_1$, $R_2$, $R_3$, $R_4$, $R_5$ and $R_6$ of Formula (II) are selected independently from the group consisting of H, OH, linear, cyclic or branched $C_{1-18}$ alkyl, $C_{1-6}$ alkenyl, $C_{1-6}$ alkoxy, $C_{1-6}$ aminoalkyl, $C_{1-12}$ vinyl alkyl; $C_{6-18}$ aryl, $C_{3-18}$ epoxy-forming groups and di($C_{1-6}$alkyl) hydrogensilyl;

wherein A is independently O or $C_{1-6}$ alkyl;
wherein B is independently $Si(R_1)(R_2)$ or $R_1$;
wherein $x_1$ ranges from $_1$ to 3000 inclusive;
wherein $x_2$ ranges from 0 to 500 inclusive;
wherein $x_3$ is either 0 or 1;
wherein $x_4$ is either 0 or 1;
wherein $x_5$ is either 0 or 1;
wherein $x_6$ is either 0 or 1;
a catalyst which accelerates the reaction between Formula (I) and Formula (II), the catalyst selected from the group consisting of KOH, NaOH, HCl, $C_{1-16}$ alkylbenzenesulfonic acids, a $C_{1-6}$ trialkoxy silanes, a $C_{1-12}$ alkylamines, $C_{1-12}$ alkanoic acids, $C_{1-12}$ alkanol, organotin compounds, organotitanate compounds and organozirconate compounds; and wherein the composition having no added perfluorinated compounds and the weight percentages of all added components above totaling 100% of the weight of the composition; and further wherein the composition exhibits both water-resistant and oleophobic characteristics.

13. The composition according to claim 12 wherein the silane composition of Formula
(I) is a methoxy or ethoxy-silane.

14. The composition according to claim 12 wherein the polysiloxane of Formula (II) is
a polydimethylsiloxane.

15. The composition according to claim 12 wherein the polysiloxane of Formula (II) is
a silanol terminated polydimethylsiloxane.

16. The composition according to claim 12 which is an emulsion, wherein the weight percentages of all components of the composition totaling 100% of the weight of the emulsion.

* * * * *